US012203179B2

(12) United States Patent
Ballantine et al.

(10) Patent No.: US 12,203,179 B2
(45) Date of Patent: Jan. 21, 2025

(54) SYSTEMS AND METHODS OF WATER TREATMENT FOR HYDROGEN PRODUCTION

(71) Applicant: Ohmium International, Inc., Incline Village, NV (US)

(72) Inventors: Arne Ballantine, Lugano (CH); Chockkalingam Karuppaiah, Fremont, CA (US); Ramesh Srinivasan, Banglore (IN)

(73) Assignee: Ohmium International, Inc., Newark, CA (US)

( * ) Notice: Subject to any disclaimer, the term of this patent is extended or adjusted under 35 U.S.C. 154(b) by 0 days.

(21) Appl. No.: 18/448,693

(22) Filed: Aug. 11, 2023

(65) Prior Publication Data

US 2023/0383422 A1 Nov. 30, 2023

Related U.S. Application Data

(63) Continuation of application No. 17/125,343, filed on Dec. 17, 2020, now Pat. No. 11,761,097.

(60) Provisional application No. 62/948,966, filed on Dec. 17, 2019.

(51) Int. Cl.
| | |
|---|---|
| *C25B 1/04* | (2021.01) |
| *C01C 1/04* | (2006.01) |
| *C02F 1/44* | (2023.01) |
| *C02F 1/467* | (2023.01) |
| *C02F 1/469* | (2023.01) |
| *C25B 9/23* | (2021.01) |
| *C25B 15/08* | (2006.01) |

(52) U.S. Cl.
CPC ............... *C25B 1/04* (2013.01); *C01C 1/04* (2013.01); *C02F 1/441* (2013.01); *C02F 1/4672* (2013.01); *C02F 1/4693* (2013.01); *C25B 9/23* (2021.01); *C25B 15/081* (2021.01); *C25B 15/087* (2021.01); *C02F 2201/46165* (2013.01)

(58) Field of Classification Search
CPC .... C25B 15/08–087; C25B 1/04; C25B 1/042
See application file for complete search history.

(56) References Cited

U.S. PATENT DOCUMENTS

| | | |
|---|---|---|
| 8,669,499 B2 | 3/2014 | Conrad |
| 2002/0017463 A1 | 2/2002 | Merida-Donis |
| 2002/0090868 A1 | 7/2002 | Schmitman |

(Continued)

FOREIGN PATENT DOCUMENTS

| | | |
|---|---|---|
| WO | 2018236649 A1 | 12/2018 |
| WO | 2021127156 A1 | 6/2021 |

OTHER PUBLICATIONS

PCT Application No. PCT/US2020/065577, International Preliminary Report on Patentability dated May 17, 2022.

(Continued)

*Primary Examiner* — Harry D Wilkins, III

(74) *Attorney, Agent, or Firm* — Polsinelli LLP

(57) ABSTRACT

A method includes providing raw water into a first filter assembly to remove solids from the raw water to form a filtrate, providing the filtrate from the first filter assembly into a second filter assembly to electrochemically remove ionics from the filtrate to form purified water, and providing the purified water to an electrolyzer to generate hydrogen by electrolyzing the purified water.

5 Claims, 8 Drawing Sheets

(56) References Cited

U.S. PATENT DOCUMENTS

| | | | |
|---|---|---|---|
| 2003/0062268 A1* | 4/2003 | Kosek | C25B 15/08 |
| | | | 204/252 |
| 2008/0121525 A1 | 5/2008 | Doland | |
| 2009/0139874 A1 | 6/2009 | Peter et al. | |
| 2010/0288647 A1* | 11/2010 | Highgate | C25B 15/00 |
| | | | 205/628 |
| 2011/0180416 A1 | 7/2011 | Kurashina et al. | |
| 2013/0039833 A1 | 2/2013 | Zullo | |
| 2016/0068975 A1 | 3/2016 | Smarsch et al. | |
| 2016/0377342 A1* | 12/2016 | Mermelstein | H01M 8/04179 |
| | | | 62/617 |
| 2017/0356094 A1 | 12/2017 | Winther-Jensen et al. | |
| 2018/0287179 A1* | 10/2018 | Rueger | C25B 15/02 |
| 2019/0112246 A1 | 4/2019 | MacGregor | |
| 2022/0243340 A1 | 8/2022 | Koponen et al. | |

OTHER PUBLICATIONS

PCT Application No. PCT/US2020/065577, International Search Report and Written Opinion dated Apr. 15, 2021.
U.S. Appl. No. 17/125,343 Office Action mailed Oct. 27, 2022.
U.S. Appl. No. 17/125,343 Notice of Allowance mailed May 18, 2023.

\* cited by examiner

SYSTEMS AND METHODS OF WATER TREATMENT FOR HYDROGEN PRODUCTION

CROSS-REFERENCE TO RELATED APPLICATIONS

This application is a continuation of U.S. application Ser. No. 17/125,343, filed on Dec. 17, 2020, which claims the benefit of U.S. Provisional Patent Application No. 62/948,966, filed on Dec. 17, 2019, the entire contents of which are incorporated herein by reference.

FIELD

The present disclosure is directed to water treatment in general and, more specifically, to systems and methods of water treatment for hydrogen production.

BACKGROUND

Hydrogen is a common gas that has many uses, such as petroleum refining, metal treatment, food processing, and ammonia production. For industrial applications, hydrogen is generally formed using processes requiring non-renewable energy sources and, in particular, access to large amounts of natural gas and reliable sources water and grid power. However, because of its combustibility in air, hydrogen is difficult to store and ship. For these reasons, hydrogen is generally used at or near the site of its production which, in turn, is limited by the local availability of non-renewable energy sources.

SUMMARY

In one embodiment, a method includes providing raw water into a first filter assembly to remove solids from the raw water to form a filtrate, providing the filtrate from the first filter assembly into a second filter assembly to electrochemically remove ionics from the filtrate to form purified water, and providing the purified water to an electrolyzer to generate hydrogen by electrolyzing the purified water.

In another embodiment, a system comprises a water source, a first filter assembly in fluid communication with the water source, wherein the first filter assembly is configured to remove solids from raw water from the water source to form a filtrate, an electrolyzer including an anode, a cathode, and a proton exchange membrane between the anode and the cathode, and a second filter assembly in fluid communication between the first filter assembly and the electrolyzer, the filtrate from the first filter assembly flowable into the second filter assembly, the second filter assembly electrically energizable to remove ionics from the filtrate to form purified water flowable to the anode of the electrolyzer.

In another embodiment, a method comprises providing purified water from an electrically energizable filter assembly to a hydrogen production system including an electrolyzer, providing power from a power source to the electrolyzer to electrolyze the purified water in the electrolyzer to generate hydrogen, storing at least a portion of the generated hydrogen in a hydrogen inventory, monitoring power availability from the power source, determining a power requirement for the hydrogen production system, comparing the power requirement of the hydrogen production system to the power availability from the power source, and if the power requirement is less than the power availability, then generating power by a generator fueled by hydrogen from the hydrogen inventory, and providing the generated power to the electrolyzer to continue to generate the hydrogen.

BRIEF DESCRIPTION OF THE FIGURES

Like reference symbols in the various drawings indicate like elements.

DETAILED DESCRIPTION

Figure 1A:
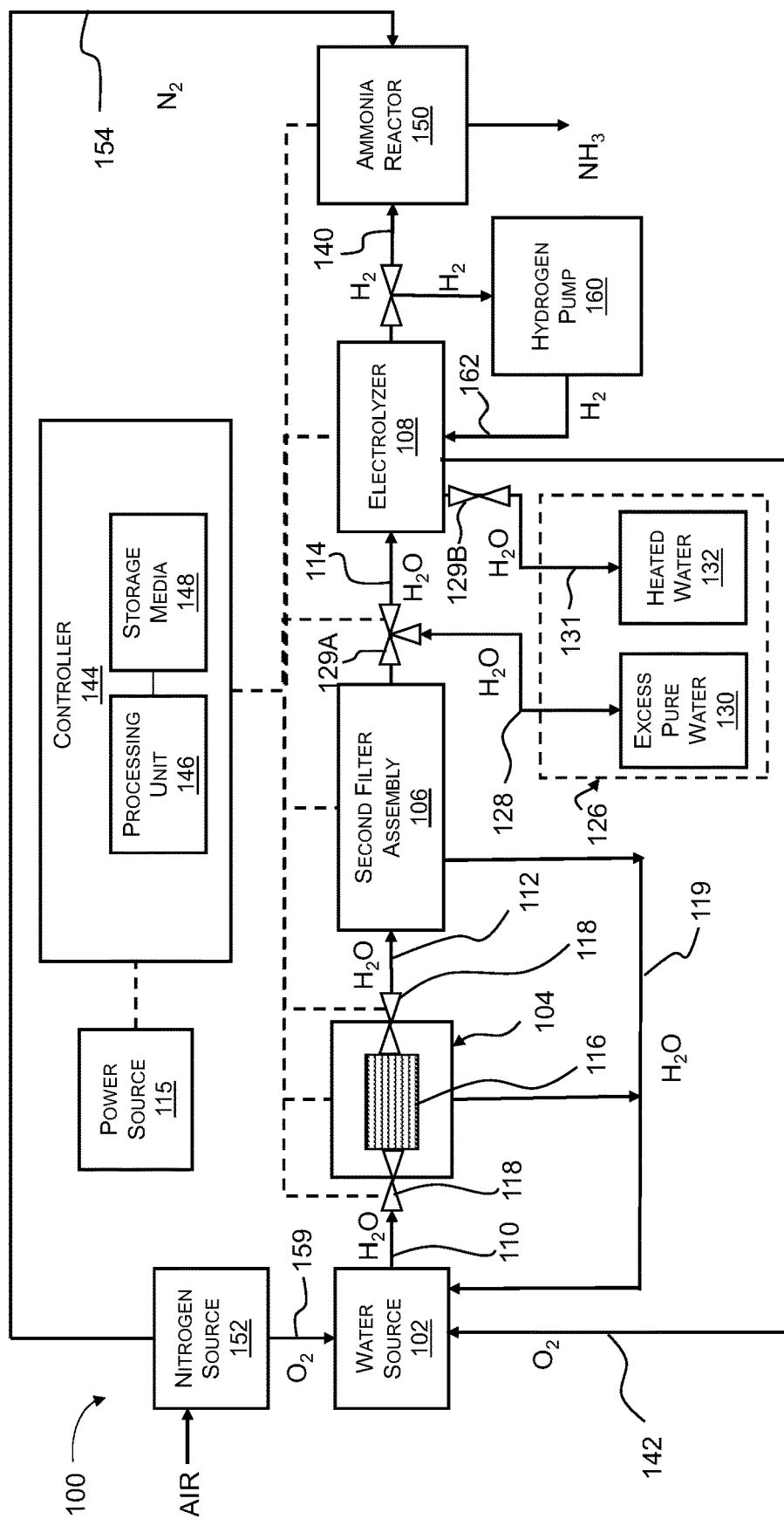
FIG. 1A is a block diagram of a system of a first embodiment for water treatment for hydrogen production, with the system including a first filtration system and a second filtration fed to an electrolyzer operable to form hydrogen.

The embodiments will now be described more fully hereinafter with reference to the accompanying figures, in which exemplary embodiments are shown. The foregoing may, however, be embodied in many different forms and should not be construed as limited to the exemplary embodiments set forth herein. All fluid flows may flow through conduits (e.g., pipes and/or manifolds) unless specified otherwise.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

Co-locating hydrogen production with its ultimate industrial use is challenging in resource constrained areas. In particular, the infrastructure for purified water in such areas is typically insufficient or unreliable for producing cost-effective quantities of hydrogen, and the electrical infrastructure for powering water treatment is often similarly limited. Accordingly, there remains a need for reliable water treatment that can produce purified water in quantities compatible with large-scale hydrogen production while being robust with respect to interruptions in access to raw water and/or power used in the purification process. In the description that follows, various aspects of water treatment systems and methods for hydrogen production are described in the context of ammonia production, as ammonia production is a common use for hydrogen and offers certain synergies with respect to the various different systems and methods described herein. It shall be appreciated, however, that this is for the sake of explanation of certain features of the systems and methods described herein and should not be considered limiting. That is, unless otherwise specified or made clear from the context, it shall be understood that any one or more of the various different systems and methods described herein may be compatible with any one or more hydrogen end-use applications. By way of example and not limitation, such hydrogen end-use applications may include use in a forming gas for a reducing environment, as described in U.S. patent application Ser. No. 17/122,813, filed on Dec. 15, 2020, entitled "SYSTEMS AND METHODS OF ELECTROCHEMICAL HYDROGEN GENERATION TO PROVIDE A REDUCING AMBIENT FOR INDUSTRIAL FABRICATION" by Ballantine et al., the entire contents of which are incorporated herein by reference.

As used herein, the term "raw water" shall be understood to include water of quality unsuitable for prolonged operation in an electrochemical electrolyzer operated to form hydrogen. Thus, for example, raw water may include water that has been contaminated by human use (commonly referred to as wastewater), some examples of which include water used in domestic, commercial, and/or industrial settings. Further or instead, wastewater may include stormwater and/or sewer inflow. In some cases, raw water may include city water, water from atmospheric condensation, or a combination thereof. In some cases, raw water may include water from a natural body of water, such as a nearby lake, river, or ocean. Thus, raw water may be fresh water or seawater. Unless otherwise specified or made clear from the context, it shall be understood that any one or more of the various systems and methods described herein may facilitate treating any or more of the foregoing examples of raw water to form purified water. In one sense, as used herein the term "purified water" may be understood in relative terms, as may be useful in discussing of any one or more aspects of the overall filtration process. For example, purified water may include water of any quality, provided that such water has a lower concentration of total solids (e.g., suspended and/or dissolved solids), a lower concentration of organics (e.g., microbiologics, such as bacteria, etc.) and/or lower concentration of at least one ionic contaminant as compared to the raw water used as the starting material in a given overall filtration process (which may have multiple stages). In another sense, as used herein, the term "purified water" may be understood in absolute terms, as may be useful in discussing any one or more aspects of electrolyzers, hydrogen pumps, fuel cells, etc. that may be sensitive to water quality. Thus, for example, purified water may include water of any quality compatible with operation of an electrochemical cell as an electrolyzer over a prolonged period of time (e.g., greater than about 12 hours) without interruption.

Referring now to FIGS. 1A-1E, a system 100 may include a water source 102, a first filter assembly 104, a second filter assembly 106, and an electrolyzer 108. The water source 102 (e.g., a raw water reservoir and/or pipe) may be in fluid communication with the first filter assembly 104 via a raw water conduit 110. The second filter assembly 106 may be in fluid communication between the first filter assembly 104 and the electrolyzer 108. For example, the second filter assembly 106 may receive a filtrate from the first filter assembly 104 via a filtrate conduit 112, and the electrolyzer 108 may receive purified water from the second filter assembly 106 via a purified water conduit 114. For example, the first filter assembly 104 may generally remove solids from the raw water to form the filtrate flowable to the second filter assembly 106 via filtrate conduit 112. Additionally, or alternatively, the second filter assembly 106 may include one or more components that are electrically energizable to remove ionics (i.e., ionic impurities and/or contaminants, such as cations (e.g., metal ions) and/or anions (e.g., chlorite ions, bromate ions, arsenate ions, etc.)) from the filtrate to form the purified water flowable to the electrolyzer 108 via the purified water conduit 114. The electrolyzer 108 may receive power from a power source 115 to electrolyze water to hydrogen. As described in greater detail below, water filtration carried out by the first filter assembly 104 and the second filter assembly 106 may be tightly integrated with hydrogen production carried out using the electrolyzer 108 such that the system 100 is robust with respect to interruptions in a supply of raw water from the water source 102. Further, or instead, as also described in greater detail below, integration between the first filter assembly 104 and the second filter assembly 106 may be robust with respect to interruptions in a supply of power to the electrolyzer 108 from the power source 115. Among other things, such robustness may facilitate sourcing power for the power source 115 from one or more sources of renewable energy to produce industrial quantities of hydrogen cost-effectively while being environmentally responsible.

In general, the first filter assembly 104 may include any one or more of various different types of equipment for removing solids from raw water received from the water source 102. For example, the first filter assembly 104 may include filter media 116. As raw water passes through the filter media 116 solids in the raw water may be physically separated from the water by restrictions in the filter media 116. As an example, the filter media 116 may include a sand bed, as may be useful in instances in which the composition of the raw water at a given installation may be prone to varying over time. Further or instead, the filter media 116 may include a specifically designed filter useful for removing solids with specific characteristics associated with a known source of raw water. In some instances, the filter media 116 may be reusable through washing and/or regeneration. However, in some cases, the filter media 116 may be disposable to reduce the amount of skilled labor required to operate the system 100. In addition to, or instead of, the use of filtration to remove solid particles, the first filter assembly 104 may carry out any one or more of various different other techniques for separating solids from the raw water. Examples of such techniques include, but are not limited to, sedimentation, dissolved air flotation, coagulation for flocculation, coagulant aids, or combinations thereof.

In some instances, the first filter assembly 104 may be passive such that the flow of raw water through the first filter assembly 104 is generally throttled only by pressure drop the first filter assembly 104. Such a configuration may be useful, for example, for operating the first filter assembly 104 without the use of external power. In installations in which power interruptions are frequent and/or of long duration, operating the first filter assembly 104 without the use of power may be useful with respect to the overall power budget of the system 100.

While operating the first filter assembly 104 without the use of power may have certain advantages in some installations, it shall be appreciated that the first filter assembly 104 may be advantageously include one or more aspects of active control by electronically activated equipment in some cases. For example, the first filter assembly 104 may include one or more valves 118 electrically actuatable to control (e.g., interrupt, reduce and/or increase) the flow of raw water through the first filter assembly 104 and, thus, to downstream components. Such control of the flow may be useful for, among other things, interrupting the flow of water to replace and/or regenerate the filter media 116 without interrupting operation of the electrolyzer 108, as described in greater detail below. The remaining residue (i.e., water with contaminants) may be recycled via the recycling conduit 119 from the first filter assembly 104 and/or the second filter assembly 106 back into the water source 102 or the raw water conduit 110, or it may be discarded.

Figure 1B:
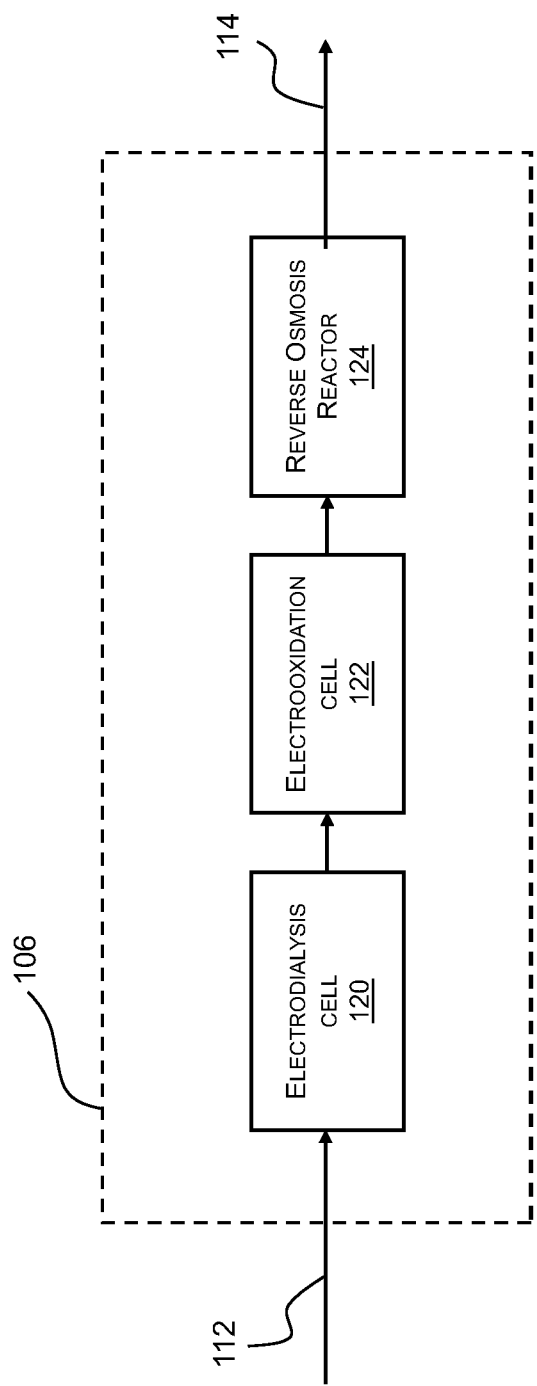
FIG. 1B is a schematic representation of the second filtration system of FIG. 1A.

In general, the second filter assembly 106 may include any one or more of various different types of filtration equipment electrically energizable to remove ionics from the filtrate received into the second filter assembly 106 via the filtrate conduit 112. As used in this context, electrically energizable may include electrochemical removal of ionics, electrical actuation of pressure-driven processes, or combinations thereof. Thus, for example, as shown in FIG. 1B, the second filter assembly 106 may include an electrodialysis cell 120 electrically actuatable to remove salts from the filtrate. As another example, the second filter assembly 106 may include an electrooxidation cell 122, which may be electrically actuated to remove contaminants, such as industrial effluents, that may be present in the filtrate. Further, or instead, the second filter assembly 106 may include a reverse osmosis reactor 124, in which electrical actuation may include moving a piston to apply pressure to the filtrate until the pressure applied to the filtrate is sufficient to overcome osmotic pressure and move the filtrate through a permeable membrane. The contaminants removed by reverse osmosis reactor 124 may depend, for example, on the permeability of the membrane, with salts and biological material being removable in some cases.

The treatment of the filtrate flowing through the filtrate conduit 112 is shown as occurring in a particular order in FIG. 1B, with the electrodialysis cell 120 followed by the electrooxidation cell 122 followed by the reverse osmosis reactor 124. However, it shall be appreciated that this is for the sake of clear and efficient description and the order of processing in the second filter assembly 106 may occur in any order, and need not be sequential, as may be useful for achieving reduction in concentration of ionics in the filtrate while making efficient use of the energy used to electrically energize the second filter assembly 106. More generally, it shall be appreciated that the second filter assembly 106 may accommodate reduction in ionics in the filtrate formed from any sources of raw water available to be used by the system 100 while achieving such reduction within a power budget afforded by other equipment of the system 100 also directly, or indirectly, being powered by the power source 115.

Filtration effectiveness of one or more portions of the second filter assembly 106 may degrade over time as ionics are removed from the filtrate to produce purified water. In some cases, such as in the case of the reverse osmosis reactor 124, performance may be restored by replacing the permeable membrane, for example. In the case of electrochemical removal components of the second filter assembly 106, electricity may be advantageously used to recover filtration effectiveness without the need to access or otherwise disturb the installation of the given component. As an example, the electrodialysis cell 120 may be flushed with purified water. With potential to electrodes of the electrodialysis cell 120 reversed, such flushing with purified water may drive accumulated impurities off of the electrode during a maintenance procedure. Performance of the electrooxidation cell 122 may be similarly recovered through reversal of polarity of electrodes while the electrooxidation cell 122 is flushed with purified water.

While all of the purified water formed by the second filter assembly 106 may flow from the second filter assembly 106 to the electrolyzer 108, it may be useful to divert at least a portion of the purified water into a supplemental water conduit 128 and into a water inventory 126 for any one or more of various different reasons. For example, in some cases, a control valve 129A may be selectively actuatable based on a state of flow of purified water from the second filter assembly 106. For example, under normal operating conditions, the control valve 129A may be actuated to divert purified water to the water inventory 126. Additionally, or alternatively, returning to the example of flushing discussed above, the control valve 129A may be selectively actuatable to direct purified water from the water inventory 126 to the second filter assembly 106.

In some cases, the water inventory 126 may serve as a backup source of purified water in the event that filtration of raw water from the water source 102 is interrupted or wanes as a result of corresponding interruptions and/or fluctuations of the raw water of the water source 102, energy produced by the power source 115, cleaning or repair of the first or second filter assemblies, or a combination thereof. That is, in the event of an interruption to the flow of purified water from the second filter assembly 106 for any reason, the control valve 129A may be selectively actuatable to direct the purified water stored in water inventory 126 (e.g., in the excess pure water module (e.g., water storage vessel) 130) to the electrolyzer 108 to sustain uninterrupted operation of the electrolyzer 108 for a period of time until the supply of raw water from the water source 102 and/or electricity from the power source 115, as the case may, returns to a level sufficient to support filtration of purified water. Given this robustness with respect to intermittency, the water inventory 126 may facilitate including renewable photovoltaic and/or wind power sources in the power source 115. That is, continuing with this example, these intermittent power sources may be used to power at least the second filter assembly 106 directly (e.g., with little or no battery) such that purified water is directed to the water inventory 126 when renewable power is available. When such renewable power is unavailable or in the event of a power outage in cases of energy source from the grid, the purified water in the water inventory 126 may be used as a source of purified water for the electrolyzer 108, ammonia synthesis, or other consumer use (e.g., drinking or cooking). In certain instances, the water inventory 126 may additionally, or alternatively, include a heated water module (e.g., a heated and/or thermally insulated water storage vessel) 132. The heated water module 132 is supplied with purified water heated by the electrolyzer 108 through a heated water conduit 131. The flow of heated water through the heated water conduit 131 may be controlled by another selectively actuatable control valve 129B. Such water may be useful, for example, for certain consumer uses.

Figure 1C:
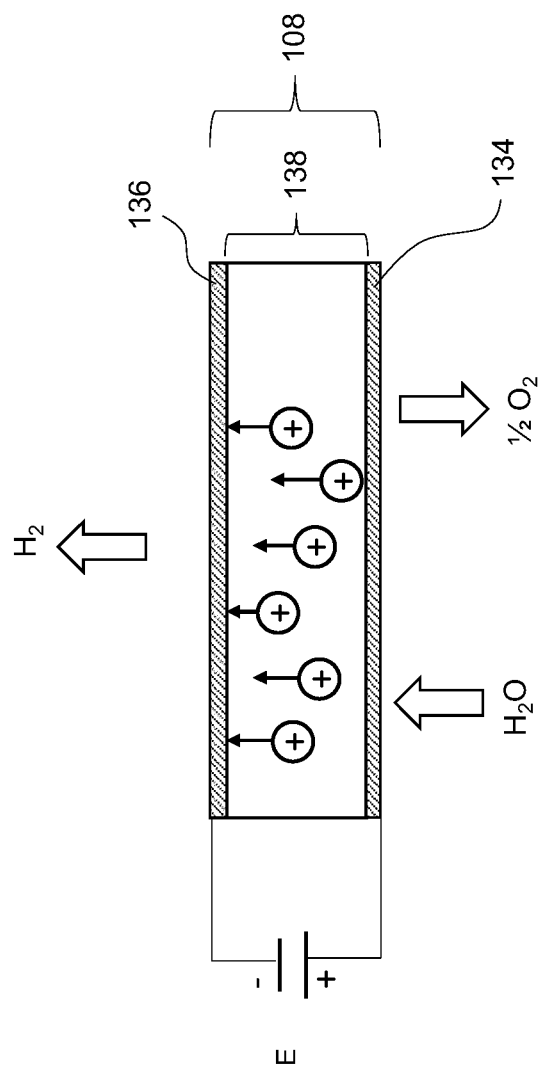
FIG. 1C is a schematic representation of the electrolyzer of the system of FIG. 1A, with the electrolyzer including a proton exchange membrane (PEM) between an anode and a cathode.

In general, the electrolyzer 108 may include at least one instance of an electrochemical cell shown in FIG. 1C. For example, the electrolyzer 108 may include an anode 134, a cathode 136, and a medium 138 therebetween. The medium 138 may include any one or more of various different proton exchange media (e.g., electrolyte) and, in particular, may include a polymer proton exchange membrane (PEM). Purified water introduced into the electrolyzer 108 via the purified water conduit 114 may flow along the anode 134. Electricity input from the power source 115 (e.g., directly and/or via a battery) may be coupled to the anode 134 and the cathode 136 to form an electric field across the medium 138. The purified water may be separated into oxygen and pressurized hydrogen in the presence of the electric field across the medium 138. More specifically, oxygen may be formed along the anode 134, and pressurized hydrogen may be formed along the cathode 136 as protons move through the medium 138 and recombine into molecular hydrogen along the cathode 136. Thus, the cathode 136 may be in fluid communication with any one or more of various different downstream applications, via a hydrogen conduit 140 shown in FIG. 1A, such that the pressurized hydrogen formed from only water and electricity may be delivered to the downstream application on a continuous basis. As described in greater detail below, in instances in which the system 100 is used to provide hydrogen for ammonia synthesis, at least a portion flowing along the hydrogen conduit 140 may flow to an ammonia synthesis reactor 150 shown in FIG. 1A.

To facilitate forming purified water through efficient use of energy, the system 100 may include a first oxygen conduit 142 in fluid communication between the electrolyzer 108 and the water source 102. Continuing with this example, the oxygen-enriched water flowing along the anode 134 of the electrolyzer 108 may flow to the water source 102 (and/or to the raw water conduit 110) via the first oxygen conduit 142. This oxygen-enriched water may be useful in the water source 102 to enhance bacterial water clean-up. Under otherwise identical conditions, this may reduce one or more filtration demands on the first filter assembly 104 and/or the second filter assembly 106 and, in some cases, may reduce the power consumption associated with filtration to form purified water.

Having described certain aspects of the system 100 for treating water for hydrogen production, attention is now directed to certain additional or alternative features of the system 100 that may be useful for, among other things, achieving suitable control over various different aspects of coordination of processes carried out by the system 100, making beneficial use of the hydrogen produced, and/or reducing the likelihood of premature degradation of elements of the system 100.

In some instances, the system 100 may include a controller 144 including a processing unit 146 and a non-transitory, computer-readable storage medium 148 having stored thereon computer-readable instructions for causing the processing unit 146 to carry out any one or more of the various different techniques described herein. For example, returning to the discussion of the water inventory 126 above, the controller 144 may control the selective actuation of the control valves 129A and/or 129B to direct purified water into and out of the water inventory 126 as useful for increasing the likelihood of sustaining hydrogen production during interruption of one or both of raw water and/or power. As described in greater detail below, operation of the controller 144 and other electrically powered aspects of the system 100 may be sustained through the use of a back-up power source such as a battery and/or a generator fueled with hydrogen from a hydrogen inventory.

In certain instances, the system 100 may include an ammonia synthesis reactor 150 and a nitrogen source 152. The ammonia synthesis reactor 150 may receive hydrogen via the hydrogen conduit 140. The ammonia synthesis reactor 150 may be in fluid communication with the electrolyzer 108 and the nitrogen source 152. In particular, the nitrogen source 152 may produce nitrogen that is flowable to the ammonia synthesis reactor 150 via a nitrogen conduit 154. With these hydrogen and nitrogen inputs and power from the power source 115, the ammonia synthesis reactor 150 may form ammonia. For example, the ammonia synthesis reactor 150 may form ammonia through electrochemical synthesis, such as described in U.S. patent application Ser. No. 17/101,224, filed on Nov. 23, 2020, entitled "SYSTEMS AND METHODS OF AMMONIA SYNTHESIS," by Ballantine et al., the entire contents of which are incorporated herein by reference.

Figure 1D:
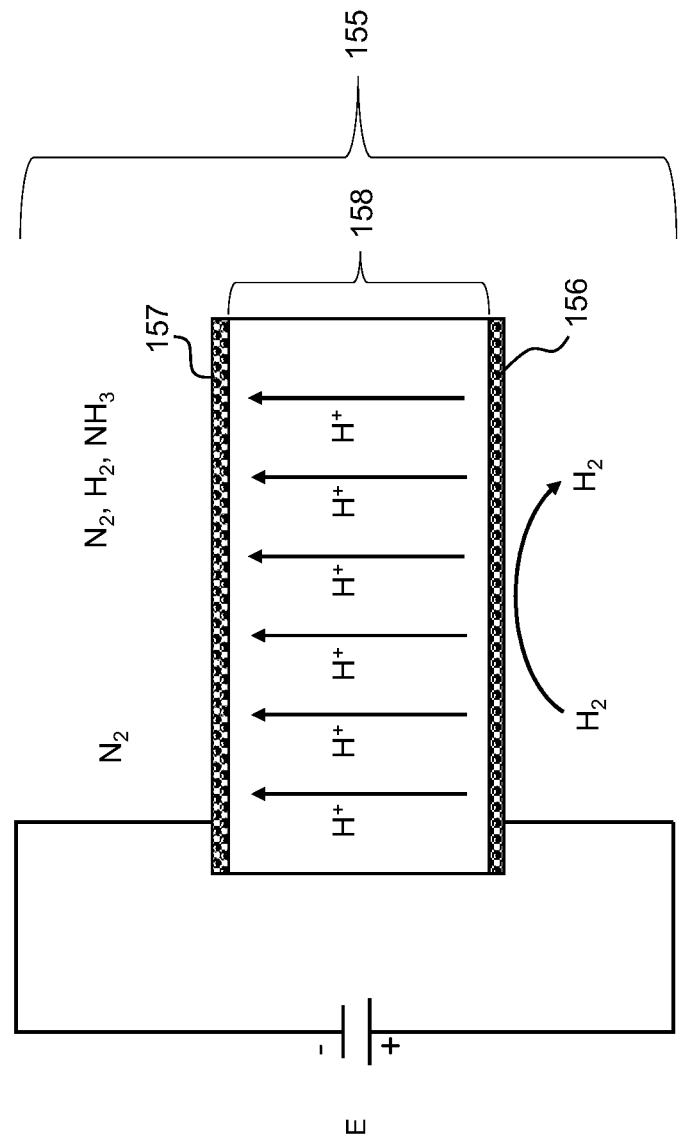
FIG. 1D is a schematic representation of an ammonia synthesis reactor of the system of FIG. 1A, with the ammonia synthesis reactor including a synthesis cell activatable to form ammonia from hydrogen and nitrogen.

In certain instances, the ammonia synthesis reactor 150 may include an electrochemical cell, such as a synthesis cell 155 (e.g., a proton-exchange membrane ("PEM") cell) operable for electrochemical synthesis of ammonia from hydrogen and nitrogen. The synthesis cell 155 may include an anode 156, a cathode 157, and a medium (e.g., electrolyte) 158, as shown in FIG. 1D. The medium 158 may be disposed between the anode 156 and the cathode 157 and, for example, may be ionically conductive to protons. As a more specific example, the medium 158 may be a proton-exchange membrane electrolyte. Additionally, or alternatively, the synthesis cell 155 may receive power from the power source 115 connected to the anode 156 and to the cathode 157 to create an electric field in the medium 158 disposed between the anode 156 and the cathode 157 (to apply a voltage between the anode 156 and the cathode 157).

The hydrogen introduced into the ammonia synthesis reactor may flow over the anode 156, where the hydrogen may break down into protons according to the following reaction:

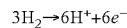

$$3H_2 \rightarrow 6H^+ + 6e^-$$

In turn, under the electric field provided by the power source 115, the protons may flow from the anode 156 to the cathode 157 through the medium 158. The nitrogen introduced into the ammonia synthesis reactor 150 may flow over the cathode 157, where the nitrogen may react with the protons to form ammonia according to the following reaction:

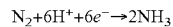

$$N_2 + 6H^+ + 6e^- \rightarrow 2NH_3$$

While the ammonia synthesis reactor 150 has been described as including a single instance of the synthesis cell 155, it shall be appreciated that this is for the sake of clarity and efficient description. More specifically, the ammonia synthesis reactor 150 may include additional instances of the synthesis cell 155 (e.g., as part of an electrochemical stack) without departing from the scope of the present disclosure.

The number of additional instances of the synthesis cell 155 may depend, for example, on desired ammonia output from the system 100. While the ammonia synthesis reactor 150 has been described as including an electrochemical cell, it shall be appreciated that the ammonia synthesis reactor 150 may include a catalyst (e.g., a catalyst operated in a Haber-Bosch processes) or a plasma-driven reactor.

The nitrogen source 152 may include a pressure swing adsorber that separates nitrogen from air using pressure swing adsorption, producing nitrogen-depleted air as a byproduct. In some instances, the nitrogen source 152 may be in fluid communication with the water source 102 to direct nitrogen-depleted air to the water source 102 (e.g., via a second oxygen conduit 159). This nitrogen-depleted—and thus oxygen enriched—air may enhance bacterial cleanup of the raw water in the water source 102.

In some implementations, the system 100 may include a hydrogen pump 160. Operation of the hydrogen pump 160 may, for example, re-establish humidification conditions of the medium 138 of the electrolyzer 108 in instances in which the medium 138 includes a proton exchange membrane. For example, the hydrogen pump 160 may be operable (e.g., via control by the controller 144) to pump hydrogen from the anode 134 to the cathode 136, cathode 136 to anode 134, or both in a sequence of fully humidified volumes.

Figure 1E:
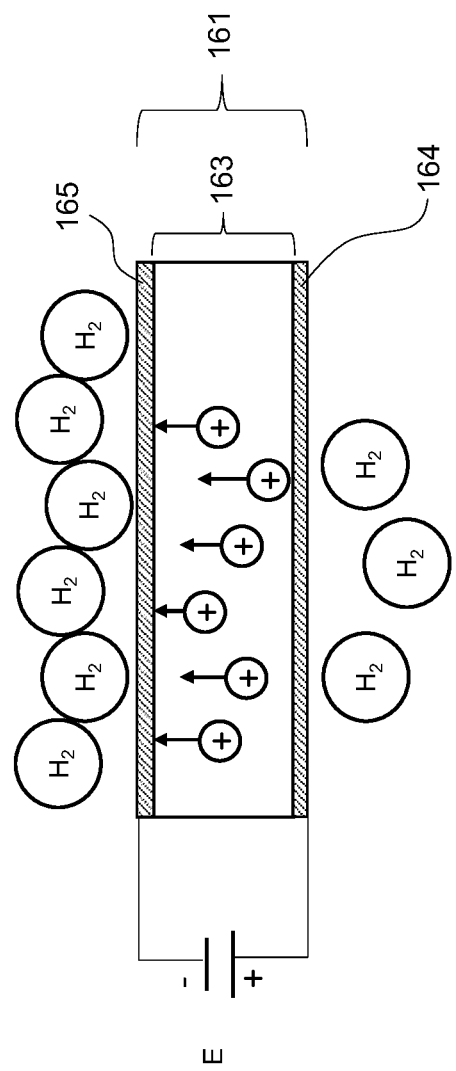
FIG. 1E is a schematic representation of an electrochemical cell of a hydrogen pump of the system of FIG. 1A.

In certain implementations, the hydrogen pump 160 may be an electrochemical membrane hydrogen pump which includes at least one instance of an electrochemical cell 161, as shown in FIG. 1E. For the sake of clarity of illustration and description, a single instance of the electrochemical cell 161 is shown. However, it shall be appreciated that the hydrogen pump 160 may include additional electrochemical cells in other instances, without departing from the scope of the present disclosure. The total number of electrochemical cells in the hydrogen pump 160 may be influenced by, among other considerations, the pressure required to move hydrogen from the hydrogen conduit 140, via the recirculation circuit 162.

The electrochemical cell 161 may include a proton exchange membrane 163, an anode 164, and a cathode 165. For example, the proton exchange membrane 163 may be disposed between the anode 164 and the cathode 165. Electrical power may be delivered to the anode 164 and the cathode 165 by the power source 115 to provide a positive charge along the anode 164 and a negative charge along the cathode 165. The resulting electrical field may result in a higher pressure concentrated along the cathode 165 than along the anode 164. As an example, at the anode 164, lower pressure hydrogen may separate into protons and electrons, and the electrical field may drive protons across the proton exchange membrane 163 to the cathode 165. Continuing with this example, the protons may recombine at the cathode 165 to form hydrogen at a higher pressure. As may be appreciated from the foregoing, sequential pumping of hydrogen may be repeated using as many instances of the electrochemical cell 161 as necessary or desirable to remove hydrogen from the hydrogen conduit 140 and electrochemically pump the removed hydrogen to a target pressure for reintroduction back into the electrolyzer 108.

Having described various aspects of the system 100 that are electrically powered by the power source 115, attention is now directed to certain aspects of the power source 115 operable to provide electricity supporting any one or more of the various different aspects of the system 100 described herein.

In addition to uninterrupted operation facilitated by various different redundancies with respect to water and power described herein, cost-effective operation of the system 100 may be a function of the power source 115 that provides electricity to various different components of the system 100. For example, the power source 115 may include multiple types of electricity generators that may be advantageously operated in parallel and/or individually at different times of the day. For example, in certain installations, the power source 115 may include the electrical grid and, even in locations in which the electrical grid is reliable, it may be useful to switch to local sources of electricity to make use of lower-cost electricity. Examples of such local sources include, but are not limited to, one or more of a diesel generator, a natural gas-fired generator, a generator powered by biofuel sources such as bio-methane, an ethanol fired generator, a gasoline fired generator, a propane fired generator, a photovoltaic array, a wind power generator (e.g., one or more wind turbines), a hydroelectric generator or turbine (e.g., tidal or dam type), a geothermal power generator, a thermoelectric power generator, a heat engine (e.g., a turbine, piston engine, or other engine which uses heat and/or fuel as an input), or a fuel cell power generator.

As may be appreciated from these foregoing examples, the power source 115 may include local sources that are nominally continuous and/or intermittent. Thus, in the case of intermittent electricity availability from a local source such as a photovoltaic array or a wind turbine, the power source 115 may preferentially be the local source when power from the local source is available without separate storage. Additionally, or alternatively, the system 100 may include a battery, as described in greater detail below, in electrical communication with the power source 115 and at least the second filter assembly 106 and the electrolyzer 108 of the system 100, such as may be useful for managing variations in power from one or more intermittent power sources by storing excess power from the local source when the excess power is available (e.g., during daytime from a photovoltaic array or during windy periods from a wind turbine) and then releasing it to the plurality of cores when the excess power is not available (e.g., during nighttime or during windless periods). As another example, in certain locations, the electrical grid may be unreliable or nonexistent such that the power source 115 primarily or exclusively includes any one or more of various different local sources, such as those listed above.

As may be appreciated from the foregoing, the power source 115 may be intermittent as a result of the mix of local power generation sources that make up the power source 115, resource constraints in the vicinity of the system 100, or a combination thereof. Accordingly, attention is now directed to certain aspects of systems and methods that may facilitate uninterrupted operation of certain functions of the system and, in particular, may be useful for the cost-effective production of hydrogen using one or more renewable energy sources that may be prone to intermittency. For the sake of clear and efficient description, elements having numbers with the same last two digits shall be should be understood to be analogous to or interchangeable with one another, unless otherwise explicitly made clear from the context and, therefore, are not described separately from one another, except to note differences or emphasize certain features. Thus, for example, the electrolyzer 108 of FIGS. 1A and 1C shall be understood to be analogous to the electrolyzer 208 of FIGS. 2A and 2B, unless otherwise indicated or made clear from the context.

Figure 2A:
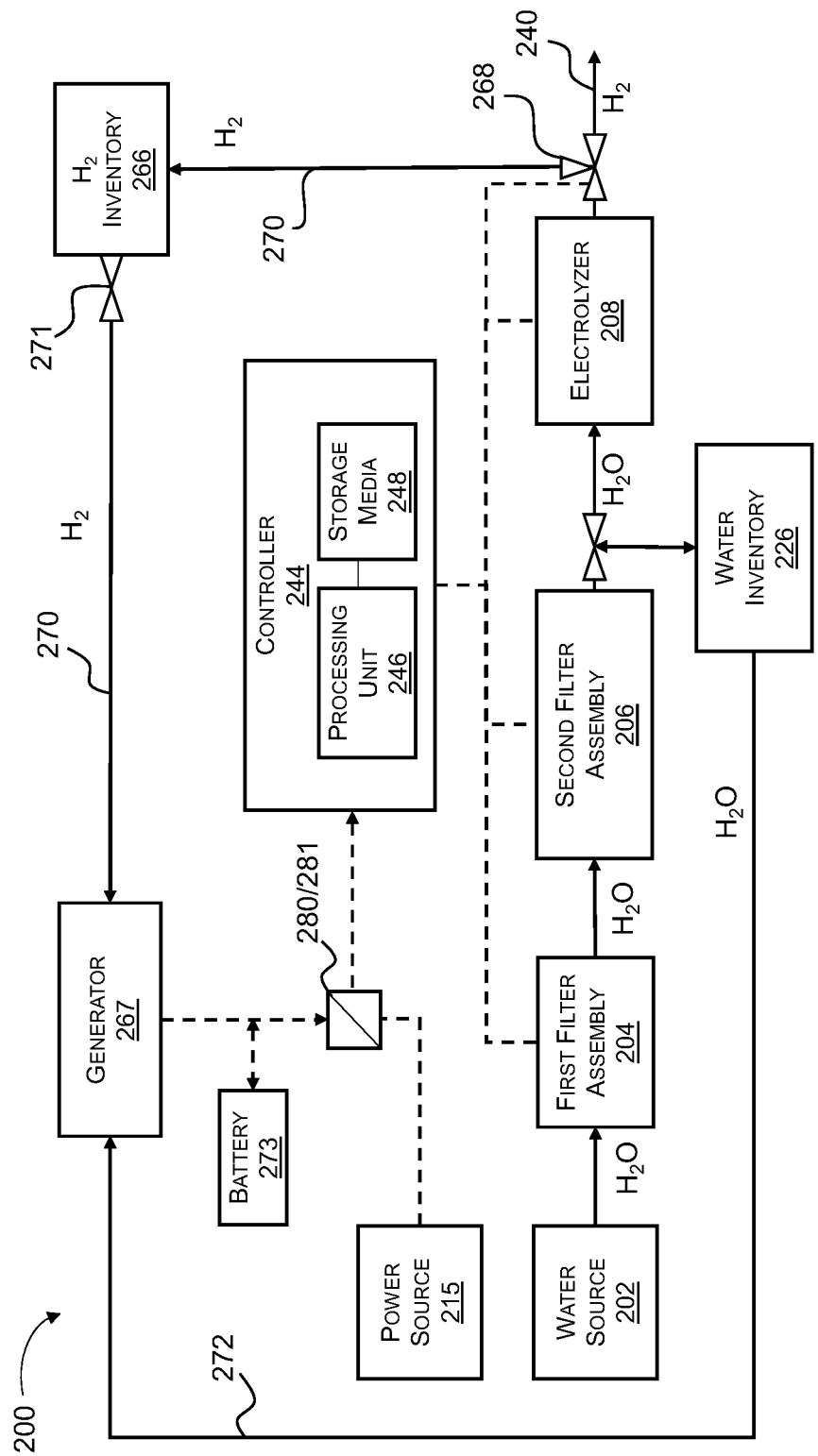
FIG. 2A is a block diagram of a system of a second embodiment for water treatment for hydrogen production, with the system including a hydrogen inventory and a generator operable with hydrogen inventory to provide an uninterruptible power supply for the system of water.
Figure 2B:
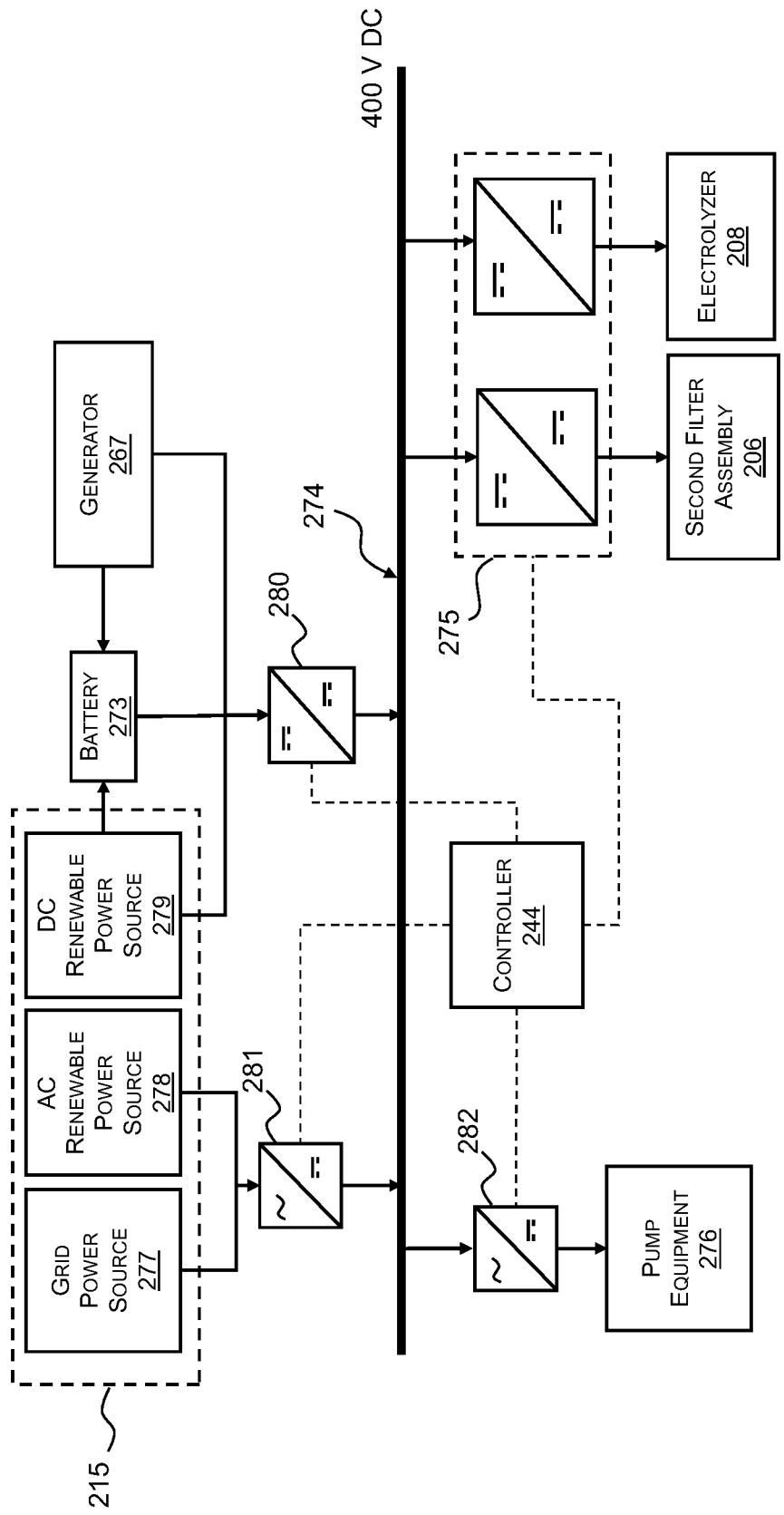
FIG. 2B is a block diagram of a power distribution of the system of FIG. 2A.

Referring now to FIGS. 2A and 2B, a system 200 may include a water source 202, a first filter assembly 204, a second filter assembly 206, and an electrolyzer 208. Raw water in the water source 202 may be formed into purified water delivered to the electrolyzer 208 according to any one or more of the various different techniques described herein. Further, or instead, the system 200 may include a water inventory 226 operable in a manner analogous to the water inventory 126 discussed above with respect to FIG. 1A to facilitate sustaining hydrogen production through interruptions in a supply of raw water.

In certain implementations, the system 200 may include a hydrogen inventory 266 and a generator 267. The hydrogen inventory 266 may be a hydrogen storage vessel, such as at least one gas storage tank or cylinder. In general, the hydrogen inventory 266 may be in fluid communication with the electrolyzer 208 to receive hydrogen from the electrolyzer 208. For example, a first hydrogen valve 268 may be selectively actuatable (e.g., by a controller 244 including a processing unit 246 and a non-transitory computer-readable storage medium 248) to direct at least a portion of the hydrogen flowing from the electrolyzer 208 to the hydrogen inventory 266 via a first hydrogen supply conduit 269. For example, during normal operation, the first hydrogen valve 268 may be controlled to direct a portion of the hydrogen from the electrolyzer 208 to the hydrogen inventory 266, with the remainder of the hydrogen moving along a hydrogen conduit 240 to be used according to any one or more of various different end-uses described herein. Additionally, or alternatively, the first hydrogen valve 268 may be selectively actuatable to stop the flow of hydrogen to the hydrogen inventory 266 in the event of an interruption of electricity from a power source 215 providing electricity to various different aspects of the system 100 during normal operation. That is, during an interruption of power from the power source 215, the first hydrogen valve 268 may be actuated to direct all of the hydrogen produced by the electrolyzer 208 to an end-use application to reduce the likelihood of interrupting hydrogen production in a way that might cascade to the end-use of the hydrogen. Additionally, or alternatively, in the event of interruption of electricity from the power source 215, fluid communication between the hydrogen inventory 266 and the generator 267 may be established along a second hydrogen supply conduit 270 via selective actuation of a second hydrogen supply valve 271.

With fluid communication established between the hydrogen inventory 266 and the generator 267 when power from the power source 215 is interrupted, the generator 267 may operate on hydrogen from the hydrogen inventory 266 to provide power to sustain operation of at least one of the first filter assembly 204, the second filter assembly 206, or the electrolyzer 208. For example, in certain implementations, the generator 267 may sustain operation of the first filter assembly 204 and the second filter assembly 206 to continue producing purified water that may be used by the system 200. Additionally, or alternatively, the generator 267 may power the electrolyzer 208 to allow the electrolyzer 208 to continue making hydrogen while power from the power source 215 is interrupted. In some cases, the electrolyzer 208 may continue to produce hydrogen using purified water from the water inventory 226. Further, or instead, the electrolyzer 208 may continue to produce hydrogen using purified water as it is being produced by the second filter assembly 206.

In general, the generator 267 may be any one or more of various different energy sources operable to produce electricity from hydrogen. Thus, in some instances, the generator 267 may include an internal combustion engine. Further, or instead, the generator 267 may include a fuel cell (e.g., a proton exchange membrane fuel cell). In such instances, a water supply line 272 may couple the water inventory 226 in fluid communication with the generator 267 such that water from the water inventory 226 may be delivered to the generator 267. While the generator 267 may be sized to provide power for at least water purification and/or hydrogen production via electrolysis, it shall be appreciated that the generator 267 may be sized to support operation of one or more other types of equipment (e.g., ammonia synthesis) during power interruption to reduce the likelihood of cascading interruptions of downstream processes.

In some cases, the system 200 may further include a battery 273 in electrical communication with the generator 267, which may be useful for providing energy storage providing a buffer for operation of equipment that may have surges in demand. Additionally, or alternatively, to the extent the power source 215 includes DC renewable power sources, the battery 273 may be in electrical communication with the power source 215, as described in greater detail below with respect to FIG. 2B.

Figure 3:
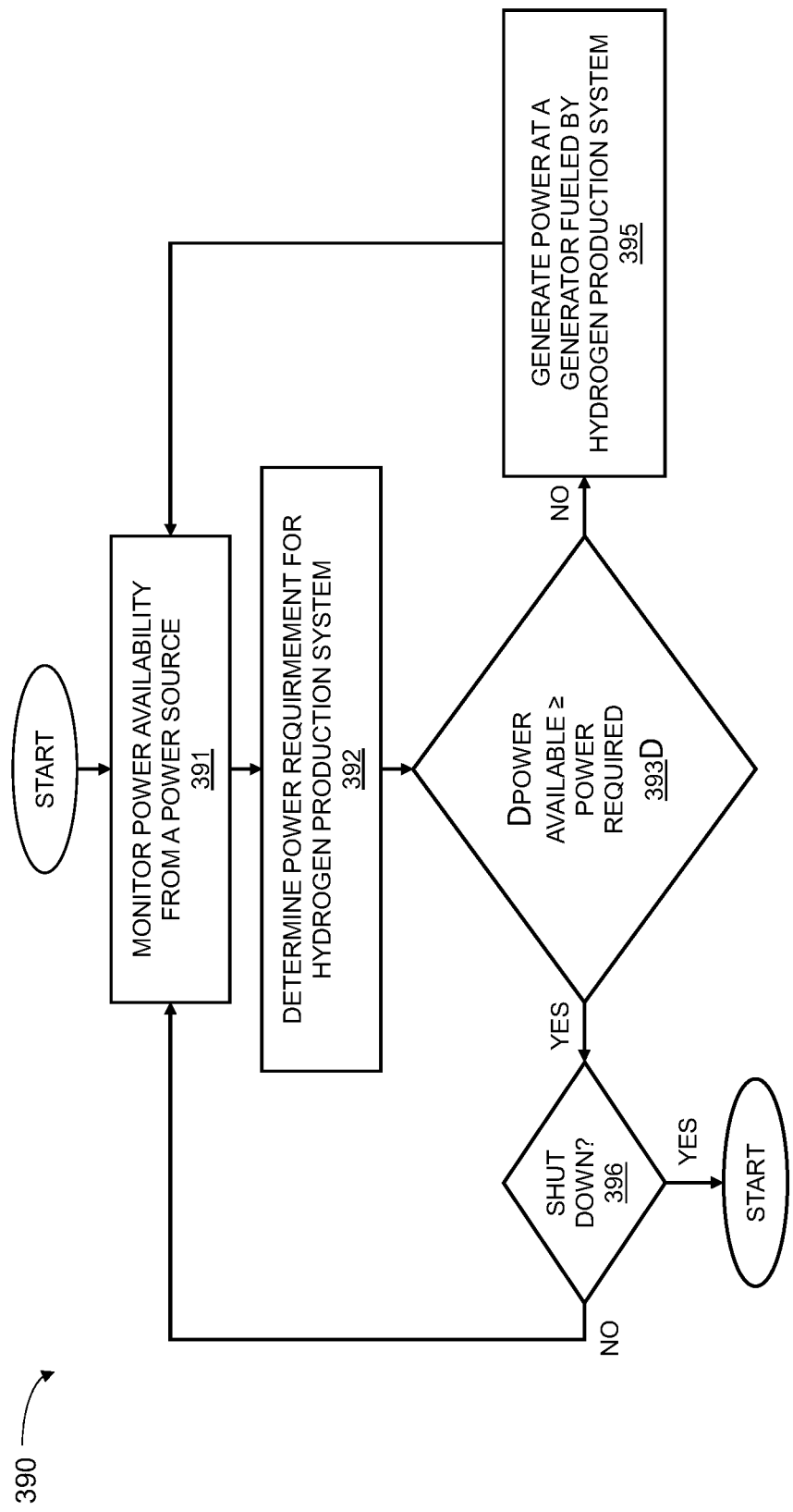
FIG. 3 is a flowchart of an exemplary method for providing uninterruptible power to a system of water treatment for hydrogen production.

FIG. 3 is a flow chart of an exemplary method 390 for providing uninterruptible power to a system of water treatment for hydrogen production. Unless otherwise specified or made clear from the context, the exemplary method 390 may be implemented using any one or more of the various different systems, and components thereof, described herein. Thus, for example, the exemplary method 390 may be implemented as computer-readable instructions stored on the non-transitory computer-readable storage medium 248 and executable by the processing unit 246 of the controller 244 to operate the system 200, as shown in FIG. 2A.

As shown in step 391, the exemplary method 390 may include monitoring power availability from a power source. Such monitoring may include, for example, monitoring power availability from the power source in real-time, such as through measurement of voltage and/or current at one or more points in the power source. As a specific example, monitoring power availability from the power source may include detecting an outage as the outage occurs, such as may be achievable using one or more switches and/or sensors. In some cases, monitoring may further or instead include predictions of power availability, such as based on past fluctuations and/or environmental conditions known to impact power generation by the power source.

As shown in step 392, the exemplary method 390 may include determining a power requirement for a hydrogen system, such as any one or more of the various different hydrogen production systems described herein. Thus, in particular, the hydrogen production system may include at least an electrolyzer receiving purified water from an electrically energizable filter assembly.

As shown in step 393, the exemplary method 390 may include comparing the power requirement of the hydrogen production system to power availability from the power source. In general, this comparison may serve as a basis for whether or not to use a hydrogen fueled generator and/or the battery as a power supply to sustain operation of the hydrogen production. The hydrogen fueled generator may include, for example, the generator 267 in FIG. 2A and thus may be a generator fueled by hydrogen output from an electrolyzer (e.g., hydrogen stored in a hydrogen inventory). Further, or instead, the hydrogen fueled generator may be operable to convert hydrogen into power for operation of the electrolyzer.

As shown in step 395, the exemplary method 390 may include generating power at the generator if the power available from the power source is less than the power required for operation of the hydrogen production system to produce hydrogen (with a margin of safety applicable in some instances). Additionally, or alternatively, generating power at the generator may include controlling a flow of hydrogen into a hydrogen inventory from the electrolyzer and out of the hydrogen inventory to the generator. As a specific example, such control may include interrupting flow of hydrogen into the hydrogen inventory from the electrolyzer while establishing a flow of hydrogen out of the hydrogen inventory to the generator. That is, all of the hydrogen produced by the system while the generator is operable may be directed out of the system, thus reducing the likelihood that hydrogen demands of the end-use application will not be met.

In instances in which the generator includes a fuel cell power generator, generating power at the generator may include controlling a flow of purified water from the electrically energizable filter assembly into a water inventory and controlling the flow of purified water from the water inventory to the generator. In particular, such control may include interrupting a flow of purified water from the electrically energizable filter assembly into the water inventory while establishing a flow of purified water from the water inventory to the generator.

As shown in step 396, the exemplary method 390 may checking whether a shutdown condition is appropriate and shutting down if so. Otherwise, the exemplary method 390 may continue to repeat any one or more of the steps described above as part of a continuing monitoring process useful for reducing the likelihood of disruption to a hydrogen production process in the event of intermittent availability of electricity.

Having described various aspects of systems and methods useful for avoiding or mitigating disruptions in one or both of water or electricity inputs to hydrogen production, attention is now directed to certain aspects of power distribution that are useful in any one or more of the various different systems described herein.

Referring again to FIG. 2B, the system 200 may include a common directed current (DC) bus 274 (e.g., a 400 V bus or another suitable voltage bus) in electrical communication with power electronics 275 (e.g., fully isolated such that ground faults do not result in ground faults in the rest of the plant), such as may be useful for integrating power electronics of the second filter assembly 206 and the electrolyzer 208. In instances in which the second filter assembly 206 and the electrolyzer 208 operate on the same DC voltage, the power electronics 275 may be a single integrated unit (e.g., a single DC/DC converter). In instances in which the second filter assembly 206 and the electrolyzer 208 operate on a different DC voltages, the power electronics 275 may include plural DC/DC converters In some instances, the power electronics 275 may be useful for diagnosing degradation of second filter assembly 206, the electrolyzer 208, or a combination thereof. For example, the power electronics 275 may include impedance monitoring of electrochemical cells of the second filter assembly 206 and/or the electrolyzer 208 to trigger reductions in current and/or promote achieving long component life (e.g., by triggering one or more recovery processes such as reversal of polarity along the common DC bus 274 through actuation by the controller 244). For example, the power electronics 275 may be operable to generate ripple current for impedance measurement and to monitor impedance of the electrolyzer 208. The power electronics 275 and the controller 244 which controls the power electronics 275 may be able to then conduct fast Fourier transform analysis to derive the frequency and amplitude of component impedance values.

Other equipment used to operate the system 200 may be coupled to the common DC bus 274 to receive power. For example, in some cases, pump equipment 276 used for balance of plant pumping and compression may be coupled to the common DC bus 274. For example, the pump equipment 276 may comprise fluid pumps, fans and/or blowers which operate on alternating current (AC). In this configuration, the pump equipment 276 may be connected to the common DC bus 274 via one or more DC/AC inverters 282.

The power source 215, the battery 273, and the generator 267 may each be electrically coupled to the input side of the common DC bus 274 and to one another. For example, the power source 215 may include one or more of an AC grid power source 277, an AC renewable power source 278 (e.g. a wind turbine), and/or a DC renewable power source 279 (e.g., a photovoltaic array). In instances, in which the power source 215 includes the DC renewable power source 279, the generator 267 and the DC renewable power source 279 may each be in electrical communication with the battery 273 and with a DC/DC converter 280 such that each source of power may be directed to the battery 273 and/or to the common DC bus 274 as needed to meet power demands. The AC grid power source 277 and the AC renewable power source 278 (e.g. a wind turbine) may be electrically connected to the common DC bus 274 through one or more additional AC/DC inverters 281.

In certain implementations, the controller 244 may be configured to auctioneer power at the common DC bus 274 to direct available power proportionally at least to the second filter assembly 206 and the electrolyzer 208. This may facilitate optimal plant operation within the budget of available power. Further, or instead, the controller 244 may allocate power for water purification flushing and other periodic plant activities and accommodate such power allocation by cutting back power to the electrolyzer 208.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. A method, comprising:
   providing raw water into a first filter assembly to remove solids from the raw water to form a filtrate;
   providing the filtrate from the first filter assembly into a second filter assembly to electrochemically or electrically remove ionics from the filtrate to form purified water;
   providing the purified water to an electrolyzer to generate hydrogen by electrolyzing the purified water;
   pressurizing the hydrogen generated by the electrolyzer in a hydrogen pump; and
   recirculating the pressurized hydrogen to the electrolyzer.

2. The method of claim 1, wherein the second filter assembly includes an electrodialysis cell, an electrooxidation cell, or a combination thereof.

3. The method of claim 1, further comprising providing the hydrogen generated by the electrolyzer to an ammonia synthesis reactor to produce ammonia.

4. The method of claim 1, further comprising storing the hydrogen generated by the electrolyzer in a hydrogen storage vessel.

5. The method of claim 1, further comprising providing the hydrogen generated by the electrolyzer to a generator.

* * * * *